April 1, 1924.
A. KASSLER ET AL
TANK CAR
Filed Nov. 3, 1922    8 Sheets-Sheet 8
1,488,685
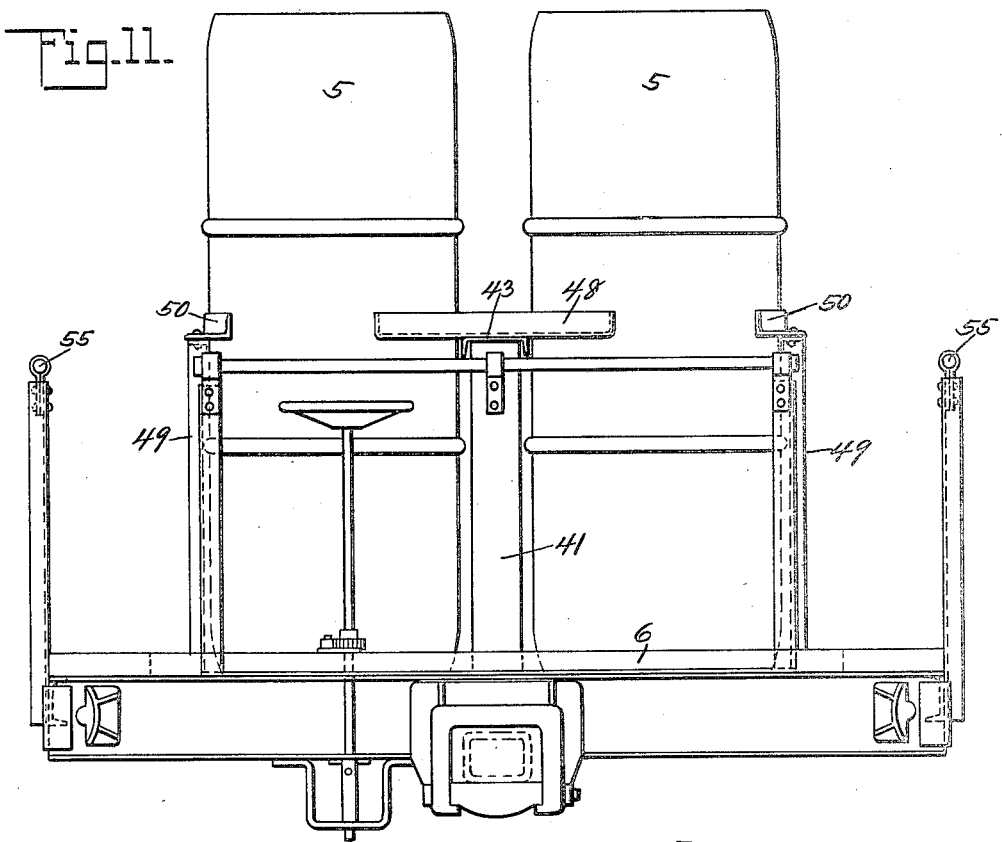
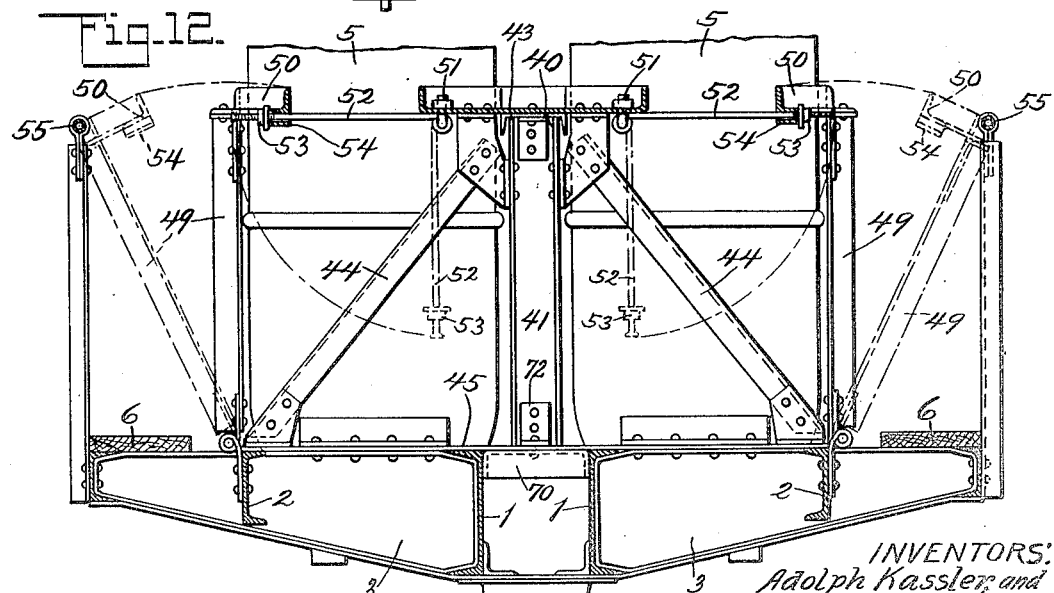
INVENTORS:
Adolph Kassler, and
John B. D. Thompson
BY F. H. Gibbs
ATTORNEY.

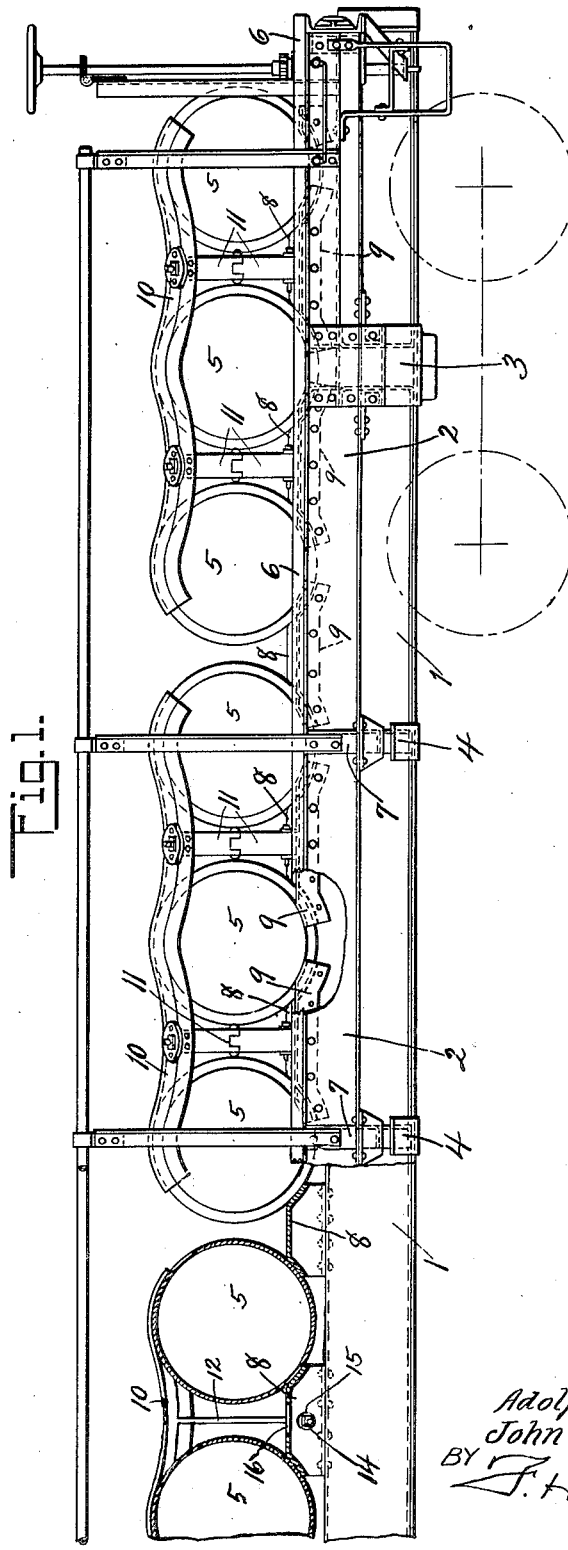

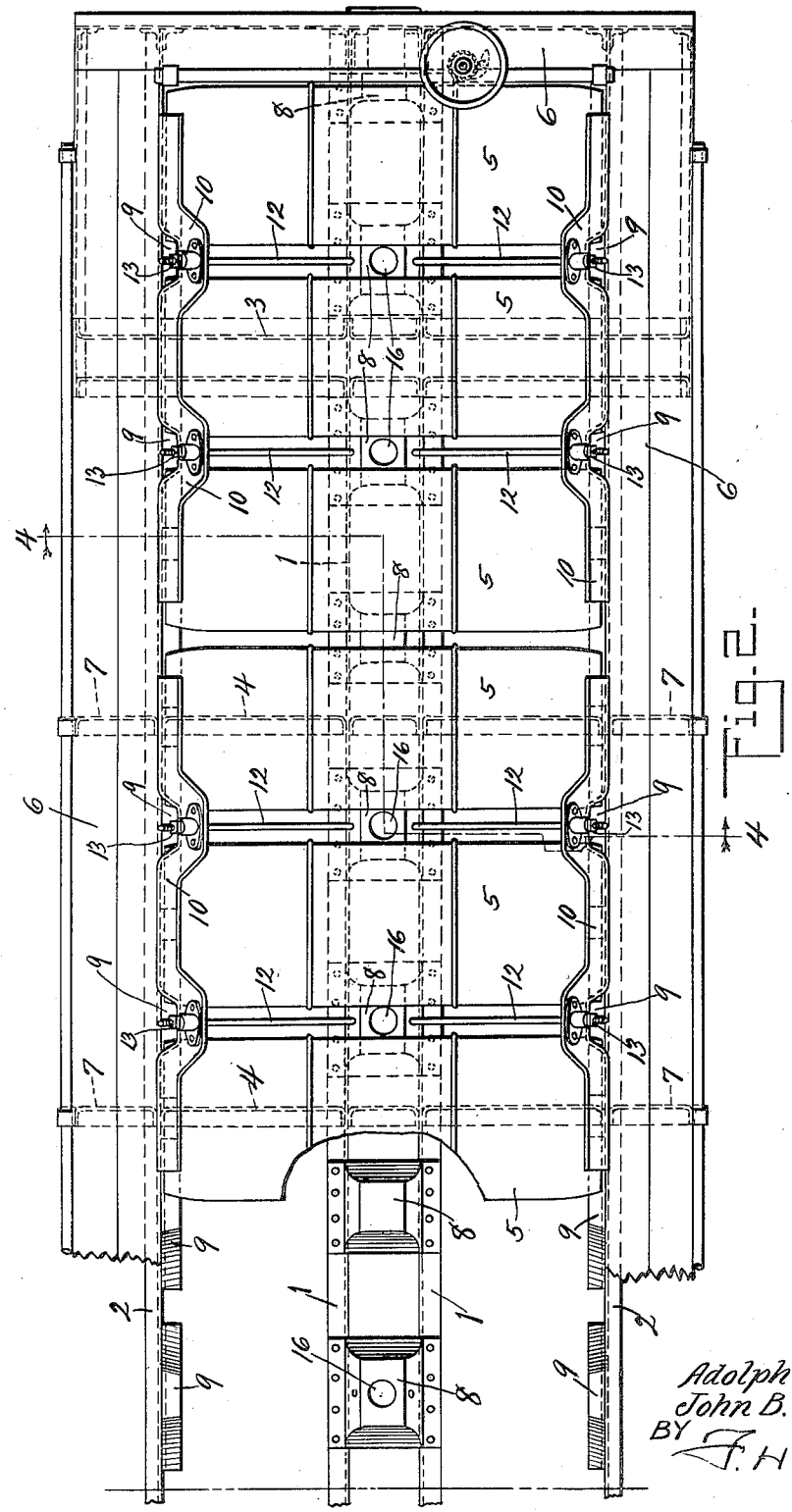

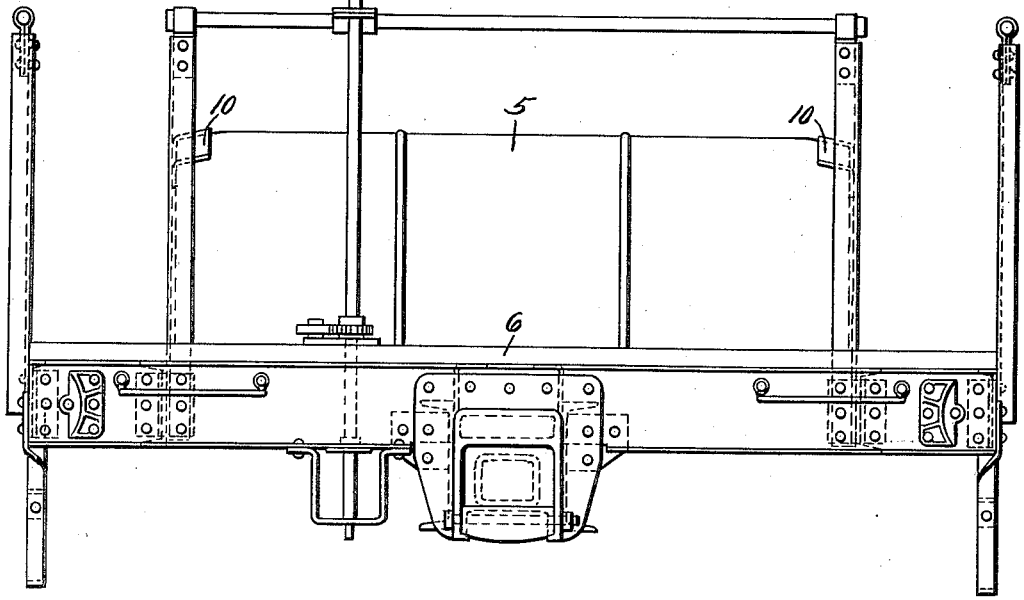
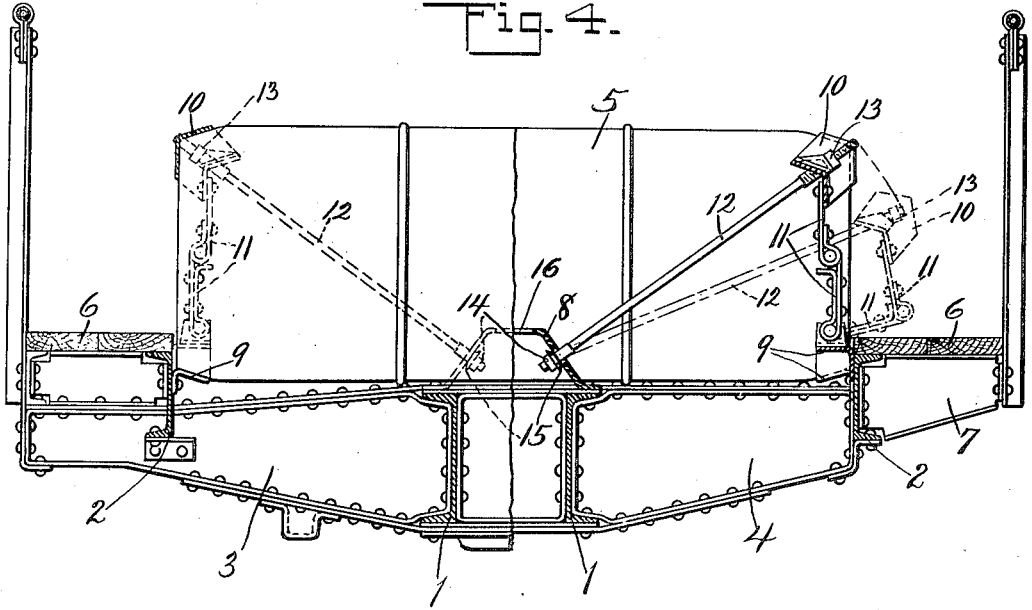

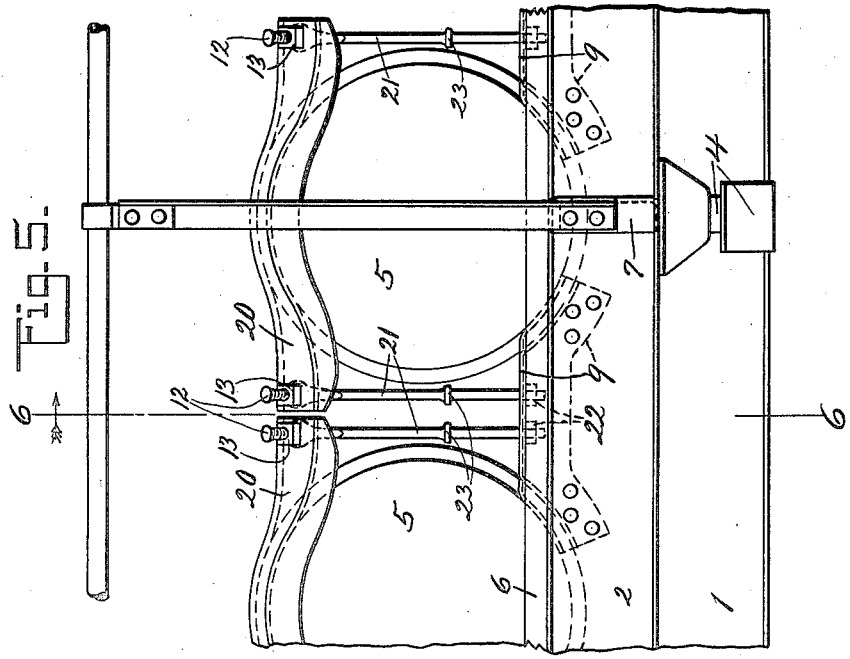
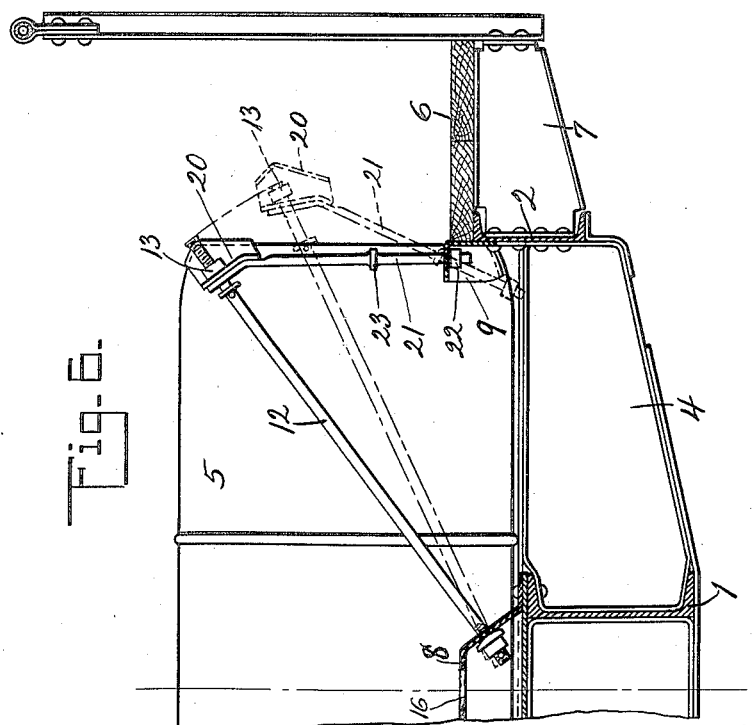

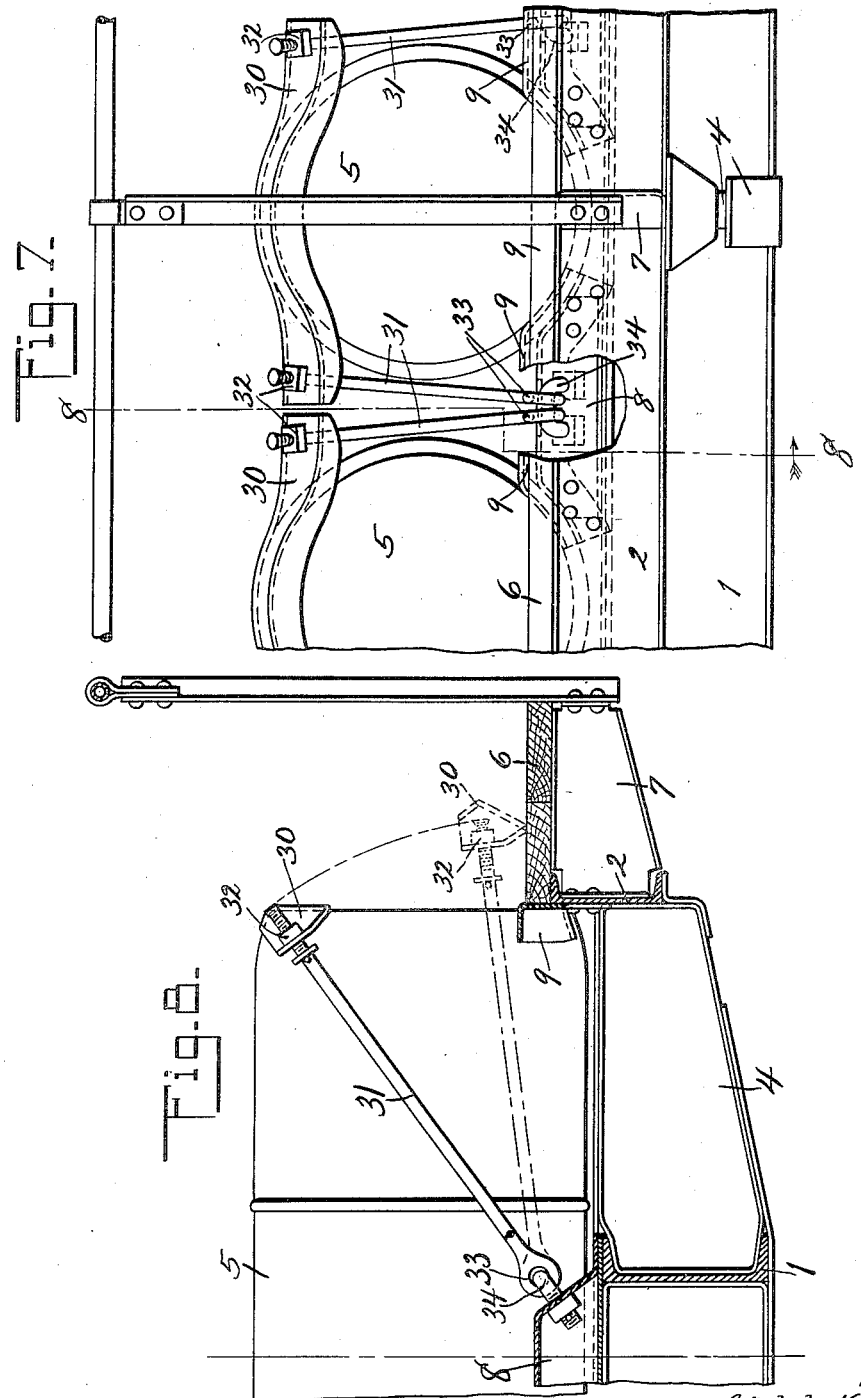

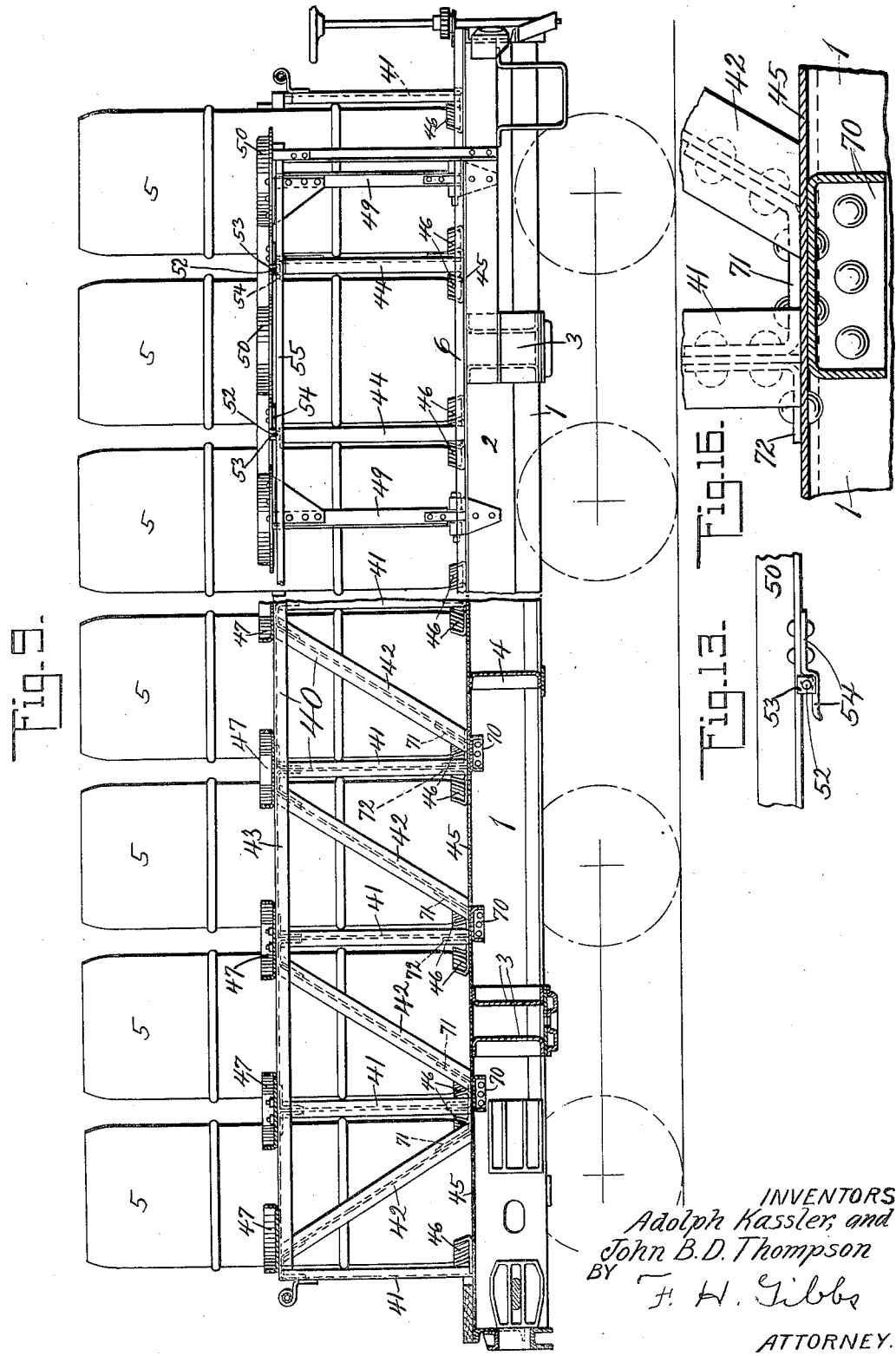

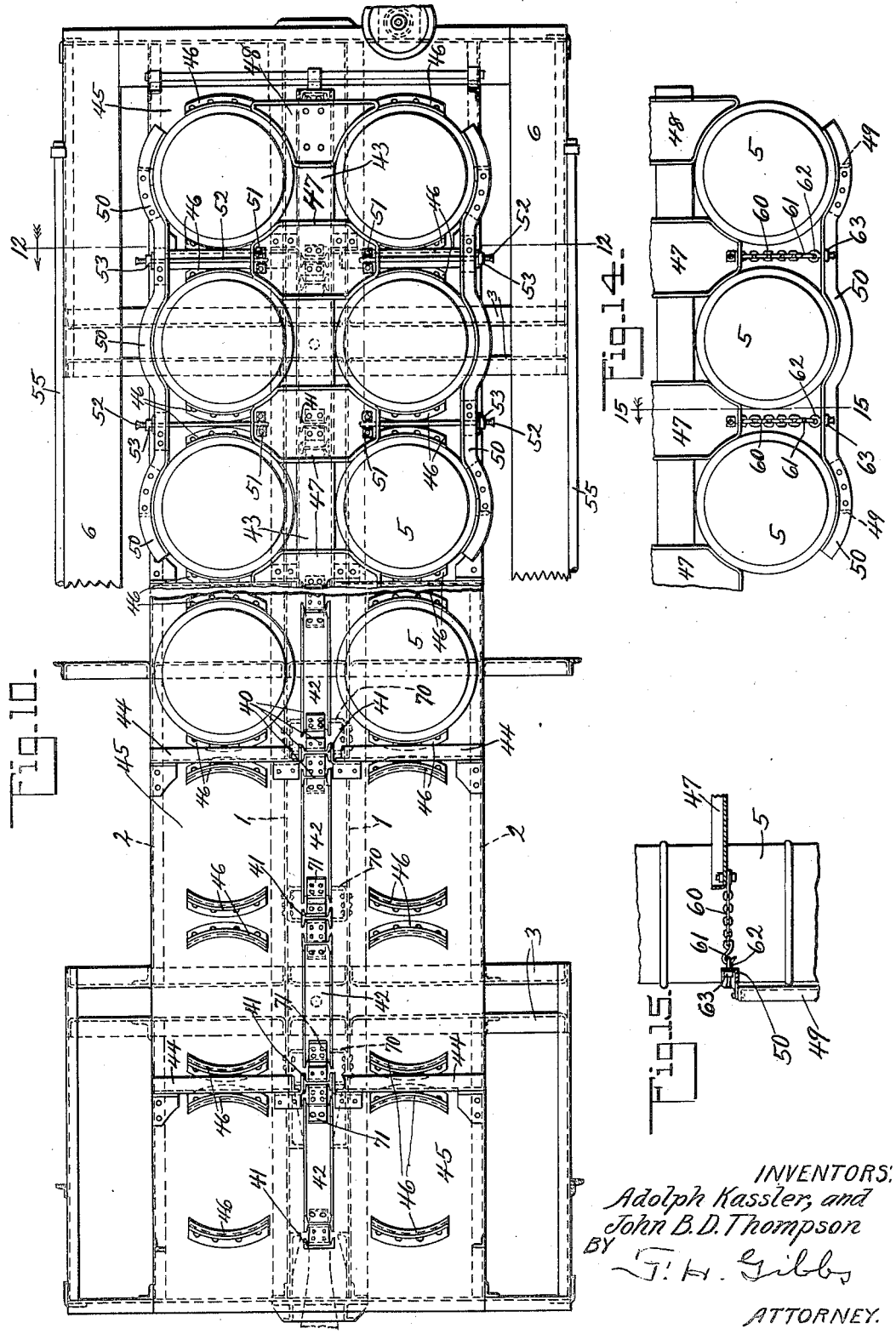

Patented Apr. 1, 1924.

1,488,685

UNITED STATES PATENT OFFICE.

ADOLPH KASSLER, OF WEST HOBOKEN, NEW JERSEY, AND JOHN B. D. THOMPSON, OF NEW YORK, N. Y., ASSIGNORS TO AMERICAN CAR AND FOUNDRY COMPANY, OF NEW YORK, N. Y., A CORPORATION OF NEW JERSEY.

TANK CAR.

Application filed November 3, 1922. Serial No. 598,751.

*To all whom it may concern:*

Be it known that we, ADOLPH KASSLER and JOHN B. D. THOMPSON, residing at West Hoboken, Hudson County, State of New Jersey, and New York, N. Y., respectively, and being citizens of the United States, have invented certain new and useful Improvements in a Tank Car, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a view partly in side elevation, with parts broken away, and partly in central vertical section, of a tank car constructed in accordance with this invention;

Fig. 2 is a top plan view, the tanks being in part removed and the running boards broken away;

Fig. 3 is an end elevation;

Fig. 4 is in part a transverse vertical section adjacent the bolster and in part a similar section taken adjacent one of the cross bearers as on the line 4—4 of Fig. 2, the tank in each instance being shown in elevation;

Fig. 5 is a fragmentary side elevation of a modified form of this invention;

Fig. 6 is a vertical section taken on the line 6—6 of Fig. 5, showing one half of a car;

Fig. 7 is a fragmentary side elevation, partly broken away, of another modification of this invention;

Fig. 8 is a vertical section taken on line 8—8 of the modification shown in Fig. 7;

Fig. 9 is a view partly in side elevation and partly in central vertical section of a further modification of this invention;

Fig. 10 is a plan view of the modification shown in Fig. 9, some of the tanks being removed to show other parts more clearly;

Fig. 11 is an end elevation of the modification shown in Fig. 9;

Fig. 12 is a vertical section taken on the line 12—12 of Fig. 10;

Fig. 13 is a fragmentary view showing a clip used in this modification;

Fig. 14 is a plan view illustrating a further modification of this invention.

Fig. 15 is a vertical sectional view of the modification shown in Fig. 14 and

Fig. 16 is a connection detail hereinafter described.

It is an object of this invention to provide an improved tank car designed to carry a plurality of tanks. It is also an object of this invention to provide improved means for retaining the tanks in position on the car whereby the tanks may be readily and securely fastened in position and quickly released to permit removal of the tanks.

With these and other objects in view, this invention, as shown in the modification illustrated in Figs. 1 to 4 inclusive, comprises a tank car having a suitable underframe comprising center sills 1 and side sills 2 connected by bolster members 3 and cross bearers 4. In this construction the side sills 2 are positioned so that they project above the center sills 1 forming stops whereby the tanks 5, which in this modification are placed horizontally and cross-wise of the car, are prevented from traveling transversely of the car. Running boards 6 are provided at each side of the car supported upon the bolsters 3 and upon brackets 7, which are secured to the side sills 2 in line with the cross-bearers 4.

Secured to the center sills 1 are spaced pressed saddle members 8 shaped to conform to the tanks and adapted to engage the tanks at the center thereof. The shape and spacing of the saddle members 8 is such that the tanks will project below the engaging surfaces of the saddle members so that the saddle members will effectually prevent rolling of the tanks. Secured to the side sills 2 are spaced pressed angle members 9 the end partitions of which are shaped to conform to the tapered ends of the tanks 5 and which engage the ends of adjacent tanks at the side thereof. The angle members 9, as well as the saddle members 8, are spaced to permit the tanks to project below the engaging surfaces so as to prevent the tanks from rolling.

To secure the tanks in position on the saddle members 8 and angle members 9 there are provided pressed angle members 10 each of which, in this modification, is adapted to engage the ends of a group of three tanks, the angle members 10 being shaped to conform to the shape of the tanks and engaging both the ends and side thereof and having that portion of the angle member which comes between two tanks of a group depressed. Each angle member 10 is pivotally secured to the side sills 2 by two hinged members 11, each hinged member 11 being composed of two pivotally connected parts. Engaging in openings in the depressed portions of the angle members 10 are threaded rods 12 provided with nuts 13 adapted to hold the angle members 10 on the rods 12. The other ends of the rods 12 project through openings in the saddle members 8 and are secured therein by nuts 14 and large spherical washers 15, openings 16 being provided in the saddle members 8 to permit of access to the nuts 14.

As shown in Fig. 4 when the tanks are in position on the saddle members 8 and the angle members 9 the angle members 10 may be held against the ends of the tanks 5 by tightening the nuts 13 on the rods 12. Loosening of the nuts 13 will permit the angle members 10 to be disengaged from the tanks 5 whereupon the hinged members 11 will fold and the angle members 10 will drop to the position shown in dotted lines in Fig. 4 above the running boards 6. When the angle members 10 are in this position the removal and replacement of the tanks 5 may be readily accomplished and the angle members 10 are placed so that they will clearly indicate when any of the tanks 5 are not secured in position.

In the modification shown in Fig. 5 each angle member 20 engages the side and end of but a single tank 5 and is connected to a side sill 2 by rods 21 which pass through openings in the pressed angle members 9 and are loosely secured therein by nuts 22. The rod 21 is adapted to move freely in the opening in the angle member 9 and is limited in its movements by the nut 22 and a shoulder 23 formed on the rod. The angle member 20 is also connected by a rod 12 at each end to the pressed saddle members 8, the rods 12 being secured in the angle member 20 by the nuts 13.

In this modification also, loosening the nuts 13 will permit of the disengagement of the angle members 20 from the ends of the tanks 5 whereupon the rods 21 may slide in the openings in angle members 9 until the shoulders 23 engage with the angle members 9 whereupon the angle members 13 will have assumed the position indicated in dotted lines in Fig. 6 and clearly indicate that the tank is not secured in position.

In the modification shown in Figs. 7 and 8 each angle member 30 engages the end of a single tank and is secured to the pressed saddle member 8 by rods 31 which are secured to the angle member 30 by nuts 32 and have eyes 33 formed at their opposite ends by means of which the rods are connected by U-bolts 34 to the saddle members 8. Each U-bolt 34 is shown in this construction connected to rods 31 which serve to hold adjacent angle members 30 in position. The angle members 30 in this construction are not connected to the side sills 2 but in this construction as in the others, loosening the nuts 32 will permit of the disengagement of the angle 30 from the end of the tank whereupon it will fall into the passageway on the running board 6 where it will be readily observed.

In the modification shown in Figs. 9 to 13 inclusive there is secured to the center sills 1 a trussed girder 40 which may serve to reinforce the center sills and carry part of the load of the car. The girder 40 comprises vertical channel members 41, inclined channel members 42 and a top channel member 43, the channel members being secured to each other and to the top of the center sills in any suitable or desired manner. Lateral braces 44 which extend from the upper portion of the girder to the side sills are provided at intervals throughout the length of the girder and serve to maintain the girder in its vertical position. Connecting the center sills 1 and side sills 2 is a cover plate 45 which extends throughout the length of the car and secured to the cover plate are pairs of curved pressed angle members 46 shaped to receive the tapered ends of the tanks which are, in this modification, placed on end, a row of them being placed on each side of the girder 40. Secured to the top member 43 of the girder are pressed members 47 which conform to the shape of the tanks, and engage with four of the tanks as shown in Fig. 10 while at the ends of the girder 40 are secured the pressed members 48 which engage with but two tanks, the engaging surfaces of the pressed members 48 are, however, longer than the engaging surfaces of the pressed members 47. Pivotally secured to the side sills 2 are the angle members 49 which carry at their upper ends pressed angle members 50 which conform to the shape of the tanks. Each angle member 50 is of sufficient length to engage with three of the tanks and is connected to the side sills 2 by two angle members 49. Pivotally connected to an eye-bolt 51 mounted on the pressed members 47 are the rods 52, threaded at their opposite ends to receive nuts 53 and adapted to engage with clips 54 secured to the angle members 50. The rods 52 and nuts 53 serve to hold the angle members 50 in engagement with the sides of the tanks and to hold the tanks in position with their ends between pairs of pressed angle members 46 and their sides in engagement with a pair of pressed angle members 47. Loosening of the nuts 53 will permit the rod 52 to be disengaged from the clip 54 whereupon the angle member 50 and its supports 49 will move away from the tanks 5, as shown in dotted lines in Fig. 12, until it engages with the hand rail 55, blocking the passage way on the running board 6.

In the modification shown in Figs. 14 and 15, chain 60 having a hook 61 is secured to the pressed member 47 and adapted to engage in an eye 62 secured to the angle member 50 by a nut 63. Loosening of the nut 63 will permit of the hook 61 being disengaged from the eye 62 whereupon the angle member 50 will move away from the tanks 5 until it rests against the hand rail 55 and be in the passage way on the running board 6.

Referring to Fig. 16 it will be noted that the vertical posts 41 and diagonal braces 42 are rigidly connected with the usual center sill channels 1 by means of the inverted pressed metal pans 70, the angular tie straps 71 and the angle braces 72 at convenient intervals between the bolsters 3—3 whereby the center sills become the bottom chord, the channel 43 the top chord, and the posts 41 and braces 42 the intermediate struts of a truss girder. This truss girder forms, in effect, a very deep center sill of which the channels 1—1 with their connection members—comprising the floor, serving as a top-cover-plate—form the bottom chord.

What is claimed is:

1. In a tank car, an underframe having a passageway thereon, tanks carried by said underframe and means securing said tanks to said underframe, said securing means being adapted to project into the passage way when disengaged from said tanks.

2. In a tank car, an underframe, tanks carried by said underframe and means securing said tanks to said underframe comprising means pivotally connected to said underframe and adapted to engage the tanks and means connected to the car underframe adapted to force said first mentioned means into engagement with the tanks.

3. In a tank car, an underframe having a center sill, tanks carried by said underframe, means pivotally connected to said underframe and adapted to engage said tanks and means secured over said center sill adapted to force said first mentioned means against said tanks.

4. In a tank car, an underframe having center and side sills, tanks carried by said underframe, means movably mounted at the side sills adapted to engage the tanks and means pivotally mounted over the center sill adapted to force said first mentioned means against the tanks.

5. In a tank car, an underframe having side sills, tanks carried by said underframe, means movably mounted at the side sills adapted to engage the tanks and a connection from said means to said underframe between said side sills adapted to force said means into engagement with the tanks.

6. In a tank car, an underframe having side sills, tanks carried by said underframe and means movably mounted at the side sills adapted to secure said tanks to the underframe, said means being adapted to project into the passage way on the car when disengaged from said tanks.

7. In a tank car, an underframe having a center sill and side sills, tanks carried by said underframe, means secured to said center sill adapted to position the tanks and securing means connected to said first mentioned means and side sills and adapted to hold said tanks in engagement with said first mentioned means.

8. In a tank car, an underframe having a center sill, tanks carried by said underframe, means secured to said center sill adapted to position said tanks and securing means connected to said first mentioned means and adapted to hold said tanks in engagement with said first mentioned means, said securing means being adapted to project into the passage way on the car when disengaged from said tank.

9. In a tank car, an underframe having a center sill, a tank carried by said underframe, a member secured to the underframe at said center sill and engaging said tank, means pivotally connected to said underframe and a connection between said means and member adapted to force said means into engagement with said tank, said means being adapted to project into the passageway on the car when disengaged from said tank.

10. In a tank car, an underframe having side and center sills, a tank carried by said underframe, a member secured to said underframe at said center sill and engaging said tank and securing means connected to said underframe and said side sills, the connection between said underframe and said means being adapted to hold said means in engagement with the tank.

11. In a tank car, an underframe having side and center sills, a tank carried by said underframe, a member secured to said underframe at said center sill and engaging said tank, securing means movably secured to said underframe at said side sills and a connection between said members and said means adapted to hold said means in engagement with the tank, said securing means being adapted to project into the passageway on the car when disengaged from said tank.

12. In a tank car, an underframe having side and center sills, tank engaging means secured to the underframe at the center sill, tanks carried by the underframe and engaging said means, tank securing means connected to the underframe at the side sills and an adjustable connection between said tank engaging means and said tank securing means.

13. In a tank car, an underframe having center and side sills, tanks carried by said underframe, positioning means for said tanks secured over said center sill and means secured at said side sills adapted to secure groups of said tanks to said positioning means.

14. In a tank car, an underframe having side sills, tanks carried by said underframe, curved positioning members secured to said underframe and engaging an end of each tank, securing means pivotally connected to said side sills for engaging groups of said tanks and means connected to said underframe for forcing said securing means into engagement with said tanks.

15. In a tank car, an underframe having a center sill, tanks carried by said underframe, means over the center sills adapted to position and separate said tanks, positioning means engaging an end of each tank and securing means adapted to hold the tanks in engagement with said positioning means.

16. In a tank car, an underframe having center and side sills, tanks carried by said underframe, members mounted on said center sills adapted to engage and position a plurality of said tanks, means connected to said side sills adapted to engage said tanks and connections between said means and members adapted to force said means into engagement with said tanks.

17. In a tank car, an underframe having center and side sills, tanks carried by said underframe, members secured to said center sills adapted to separate adjacent tanks, members secured to said underframe adapted to engage the ends of said tanks and means pivotally connected to said side sills adapted to secure said tanks in position on said members.

In witness whereof we have hereunto set our hands in the presence of two witnesses.

ADOLPH KASSLER.
JOHN B. D. THOMPSON.

Witnesses:
DORETTA EDEN,
LORETTA McARDLE.